(12) United States Patent
Adkins et al.

(10) Patent No.: US 9,020,899 B2
(45) Date of Patent: *Apr. 28, 2015

(54) FILE CLONING ACROSS DIFFERENT FILESETS

(71) Applicant: International Business Machines Corporation, Armonk, NY (US)

(72) Inventors: Janet E. Adkins, Austin, TX (US); Joon Chang, Austin, TX (US); David J. Craft, Wimberly, TX (US); Manoj N. Kumar, Austin, TX (US); Ninad S. Palsule, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,082

(22) Filed: Feb. 6, 2014

(65) Prior Publication Data

US 2014/0156602 A1 Jun. 5, 2014

Related U.S. Application Data

(63) Continuation of application No. 13/457,048, filed on Apr. 26, 2012, now Pat. No. 8,666,943, which is a continuation of application No. 12/879,882, filed on Sep. 10, 2010, now Pat. No. 8,650,158.

(51) Int. Cl.
G06F 17/30 (2006.01)

(52) U.S. Cl.
CPC ...... *G06F 17/3007* (2013.01); *G06F 17/30088* (2013.01); *G06F 17/30017* (2013.01)

(58) Field of Classification Search
CPC .................. G06F 17/30017; G06F 17/30088
USPC .......... 707/639, 740, 648, 649, 657; 711/161, 711/162
See application file for complete search history.

(56) References Cited

U.S. PATENT DOCUMENTS

| | | | |
|---|---|---|---|
| 5,761,678 A | 6/1998 | Bendert et al. | |
| 6,108,697 A | 8/2000 | Raymond et al. | |
| 6,658,435 B1 | 12/2003 | McCall | |
| 7,334,095 B1 | 2/2008 | Fair et al. | |
| 7,549,037 B1 | 6/2009 | Kale et al. | |
| 7,996,636 B1 | 8/2011 | Prakash et al. | |
| 8,650,158 B2 * | 2/2014 | Adkins et al. | 707/649 |

(Continued)

OTHER PUBLICATIONS

Ohad Rodeh; B-trees, Shadowing, and Clones; Feb. 2008; ACM; 15.1-15.27.*

(Continued)

*Primary Examiner* — Jean B Fleurantin
(74) *Attorney, Agent, or Firm* — DeLizio Gilliam, PLLC

(57) ABSTRACT

A method includes determining, by a processor, that a write request indicates a clone file that was cloned from a file in a first fileset. The clone file is of a second fileset and a clustered file system comprises the first fileset and the second fileset. A data block of the clone file affected by the write request is determined. The method includes determining that the data block at a current location cannot be modified. In response to a determination that the data block at the current location cannot be modified, the method includes implementing the write request with respect to the data block at a different location and indicating that the data block at the different location can be modified for subsequent write requests that indicate the clone file.

10 Claims, 5 Drawing Sheets

(56) References Cited

U.S. PATENT DOCUMENTS

2012/0066183 A1 3/2012 Adkins et al.
2012/0209813 A1 8/2012 Adkins et al.

OTHER PUBLICATIONS

"U.S. Appl. No. 12/879,882 Office Action", Nov. 23, 2012, 8 pages.
"U.S. Appl. No. 12/879,882 Office Action", May 9, 2012, 9 pages.
"U.S. Appl. No. 13/457,048 Final Office Action", Apr. 5, 2013, 8 pages.
"U.S. Appl. No. 13/457,048 Office Action", Oct. 22, 2012, 17 pages.
Xie, Guangjun et al., "ESnapII: A Writable Dependent Snapshot System with Shared Cache", Software Engineering, Artificial Intelligence, Networking, and Parallel/Distributed Computing, 2008. SNPD '08. Ninth ACIS International Conference 2008, pp. 677-682.
Zhao, Xin et al., "Prism: Providing Flexible and Fast Filesystem Cloning Service for Virtual Servers", IFIP International Federation for Information Processing 2008, pp. 388-407.

\* cited by examiner

FILE CLONING ACROSS DIFFERENT FILESETS

RELATED APPLICATIONS

This application claims the priority benefit of U.S. application Ser. No. 13/457,048 filed Apr. 26, 2012 which claims the priority benefit of U.S. application Ser. No. 12/879,882 filed Sep. 10, 2010.

BACKGROUND

Modern file systems allowing creating clones, which allows the population of a new file system to be based on a preserved image of another file system. For example, a snapshot is a point-in-time copy of a storage device (e.g., data that constitutes one or more files of a file system) that represents a state of the storage device in time. The snapshot is used as a backup of the data of the file system so that a previous state of the data of the file system can be accessed/restored in the event of data corruption. The snapshot may be a non-persistent snapshot or a persistent snapshot. A non-persistent snapshot is a temporary snapshot that is created at every predefined time interval, while a persistent snapshot is stored permanently and is available across reboots until it is explicitly deleted. Creating a snapshot involves recording a current state of the data at the time at which the snapshot is to be created. Creating the snapshot also involves ensuring that the previously stored version of the data is not overwritten by subsequent updates to the data. Various techniques (e.g., copy-on-write, redirect-on-write, etc.) can be implemented to create the snapshot of the file system.

SUMMARY

In some embodiments, a method includes determining, by a processor, that a write request indicates a clone file that was cloned from a file in a first fileset. The clone file is of a second fileset and a clustered file system comprises the first fileset and the second fileset. A data block of the clone file affected by the write request is determined. The method includes determining that the data block at a current location cannot be modified. In response to a determination that the data block at the current location cannot be modified, the method includes implementing the write request with respect to the data block at a different location and indicating that the data block at the different location can be modified for subsequent write requests that indicate the clone file.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENTS

Figure 1:
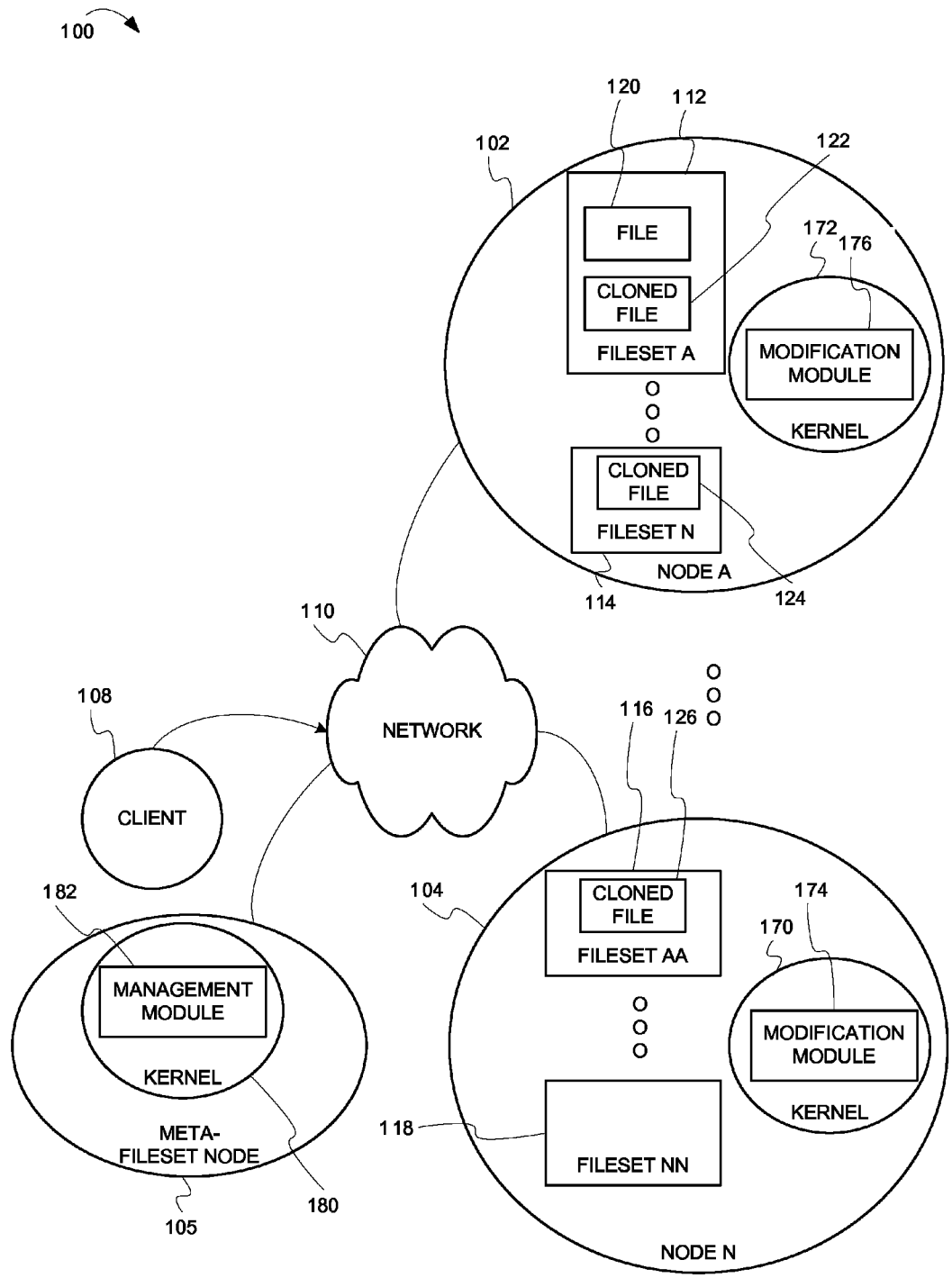
FIG. 1 is a diagram of a system for file cloning across different filesets, according to some example embodiments.

The description that follows includes exemplary systems, methods, techniques, instruction sequences, and computer program products that embody techniques of the present inventive subject matter. However, it is understood that the described embodiments may be practiced without these specific details. In other instances, well-known instruction instances, protocols, structures, and techniques have not been shown in detail in order not to obfuscate the description. The examples described herein reference a block of a file. A block can be representative of any part of a file and can be of any size. In addition, examples refer to a clustered file system, but embodiments can include a distributed file system.

Some example embodiments allow for the creation of a new image by cloning select pieces from other images in a fileset of a file system. Such a configuration provides for quick deployment of a new image and savings on storage since parts that are common are shared. A fileset can be one to N number of files that are grouped together for a specific function, for storage in a given server or node, etc. For example, in a clustered file system files can be distributed across multiple nodes (e.g., servers), wherein concurrent file input/output read and write operations are supported using the multiple nodes. Accordingly, a given fileset can be managed by a given node. In some applications, a node can store and manage one to N number of filesets. The select pieces to be cloned can be a file or parts of a file in a fileset that are cloned based on an originating file (i.e., a backing file). In some example embodiments, a fileset where the cloned file is stored is different from a fileset where the originating file is stored. Therefore, in a clustered configuration, a cloned file crossing a fileset boundary allows this file to be managed by a different node than the originating file. This can provide greater system utilization by a system administrator, as further described below.

In some example embodiments, a file system uses redirect-on-write (ROW) when data in a file is modified. In particular with a redirect-on-write, a new block is allocated for modified data. In some situations, the old location where the data was stored can be released since the data is no longer needed. With redirect-on-write, a cloned file can be created in a same or different fileset. The cloned file starts with a copy of the inode for the file. The inode can be a separate file or a data structure that stores information or metadata about the data stored in the file. For example for each part of the file (e.g., a block), the inode can store the address, the fileset identification, and the generation of the fileset where this data is stored. In particular, blocks where the data of a file are stored can be distributed across different filesets and generations of filesets. For example, each time a snapshot of a fileset is created, a new generation number can be associated with this particular snapshot. With redirect-on-write, any modifications to the cloned file would result in a change to the cloned file and not the backing file (i.e., the file from which the cloned file originated). Also, in response to a modification of the cloned file, the inode of the cloned file is updated (for the modified data) to reference the new address for the block storing the data, possible new fileset identification and possible new generation number for the fileset. In some example embodiments, the inode and the actual data of the file are stored in separate storage devices. For example, the inode can reside in memory and/or storage of a node/server, while the data can be stored in a separate storage device (e.g., Storage Area Network (SAN) disk).

However, the cloned file cannot release the original location of the block since the backing file could still be used. In some example embodiments for a same fileset, the generation numbers for the fileset can be used with block allocations when a block was allocated in the fileset to an original file. The block inherits the fileset generation when it is allocated. A cloned file starts with the current generation of the fileset when the cloned file is created. In particular, the generation of the original block is compared to the generation of the cloned file. If the generation of the cloned file is later than the generation of the original block, then the block was inherited from the backing file. In this situation, the cloned file does not release the block. However, if the generation of the cloned file is earlier or the same than the generation of the original block, then the block was not inherited from the backing file. In this situation, the cloned file can release the block.

However, comparison of generation values alone cannot be used if the cloned file is created in a different fileset, because each fileset has its own unique and independent generation numbers that cannot be compared to each other. Accordingly, to be able to release the block, additional data is stored in the inode (as described above). In particular, the fileset identification is stored in the node for the block (along with the block address and fileset generation). Therefore, the fileset identification of the original block is compared to the fileset identification of the cloned file. If these two fileset identifications do not match, then the inode of the cloned file cannot own this block. Therefore, the cloned file cannot release the block (regardless of the generations of the filesets). However, if these two fileset identifications match, a comparison of the generations of the fileset can be made to determine whether to release (as described above).

In some example embodiments, in a client/server configuration, the client can perform an update-in-place (UIP) of the file data (instead of a redirect-on-write). In this situation, the client overwrites the data stored in the block. However, if the file being modified is a cloned file, the client uses a redirect-on-write for the first write operations of the data of the cloned file in order to avoid overwriting the data in the backing file. Accordingly prior to modification, the client asks the server for the location of the data being modified. In response, the server can determine whether the data is in a cloned file and whether the data is inherited by the cloned file (using the fileset identifications and generations as described above). In some example embodiments, if the data is in a cloned file, the server transmits an indication to the client that the data is to be modified using a redirect-on-write (instead of the update-in-place as requested). As part of the redirect-on-write, the client can request a new location from the server.

Also in some example embodiments, the backing file cannot be removed while the cloned file exists because the cloned file may be accessing inherited blocks of the backing file. However in some example embodiments, an entire fileset containing the backing file can be removed. A determination is made of whether the fileset contains the backing file before removal of the fileset. In some example embodiments, a directory can store entries showing the connection between the backing file and the cloned file. If there is an associated cloned file, the fileset cannot be removed. In some example embodiments, a user can be given the opportunity to remove the dependency of the cloned file from the backing file. For example, the cloned file can be removed, modify all data in the cloned file, etc.

FIG. 1 is a diagram of a system for file cloning across different filesets, according to some example embodiments. FIG. 1 includes a system 100 having a network 110. The system also includes a node A 102 and a node N 104 that are communicatively coupled to the network 110. In some example embodiments, the system 100 can have one to N number of nodes. In some example embodiments, the system 100 is in a clustered configuration, wherein the nodes are in the clustered configuration such that data can be distributed across one to N number of nodes for storage and access. The system 100 includes a meta-fileset node 105 that is communicatively coupled to the network 110. The system 100 also includes a client device 108 that is communicatively coupled to the network 110.

Each of the nodes 102-104 can manage one to a number of filesets. In this example, the server A 102 manages a fileset A 112 and a fileset N 114. The server N 104 manages a fileset AA 116 and a fileset NN 118. The fileset A 112 includes a file 120 and a cloned file 122. The fileset N 114 includes a cloned file 124. The fileset AA 116 includes a cloned file 126. The file 120 is considered a backing file from which each of the cloned files 122, 124 and 126 are inherited from. As shown, the cloned files can be in a same fileset (the cloned file 122), a different fileset but same server (the cloned file 124) or a different fileset and different server (the cloned file 126)—relative to the backing file. As further described below, the files and cloned files can include an inode for storing metadata regarding the file and the actual data. The inode and the actual data can be stored in a same or different storage device. For example, in one application, the nodes 102-104 can store the inodes of the files, while some or all of the actual data can be stored in a separate storage device (e.g., a SAN disk).

The node A 102 includes a modification module 176 executing within a kernel 172 of an operating system executing on the node A 102. Similarly, the node N 104 includes a modification module 174 executing within a kernel 170 of an operating system executing on the node N 104. In some example embodiments, the modification modules 176 and 174 can be software, hardware, firmware or a combination thereof. In some example embodiments, the modification modules 176 and 174 can be executing outside of the kernels 172 and 170 or its associated operating system, respectively. As further described below, the modification modules 176-174 control the cloning of part of a file in a fileset. While described such that the modifications modules 176-174 are distributed across the nodes 102-104, in some other example embodiments, one or more modification modules can be external to the nodes 102-104. For example, a modification module can be executing at a global node that does not manage the filesets.

The client device 108 can be controlled by a user that can initiate file cloning causing the redirect-on-write operations (described below). For example, a user may request a cloned file of a particular file at any time. This is in contrast to a typical snapshot of an entire fileset that can periodically occur to back up the files in a fileset. As an example, the user can then perform various modifications to the cloned file and can then revert back to the backing file if necessary. Also shown, the client 108 can request an update-in-place modification to a part of a file (see communications 142). In response to the update-in-place modification request, a redirect-on-write may be required (as further described below).

The meta-fileset node 105 includes a management module 182 executing within a kernel 180 of an operating system executing on the meta-fileset node 105. In some example embodiments, the management module 182 can be software, hardware, firmware or a combination thereof. In some example embodiments, the management module 182 can be executing outside of the kernel 182 or its associated operating system. Also, in some example embodiments, the management module 182 can be executing in one of the nodes 102-104. As further described below, the management module 182 performs operations for controlling modification modules 176-174. Also, the management module 182 tracks which of the nodes 102-104 is managing each fileset. When the client device 108 requests a creation of a cloned file, the meta-fileset node 105 receives and forwards to the appropriate node. Assume that the node 102 includes a fileset which contains the original backing file and that the node 104 includes a fileset where the cloned file is to be created. The node 102 receives the request. The node 102 then forwards a request to the node 104. This request can include a copy of the inode image from the original backing file. The node 104 can create an attach point for an object for the cloned file and copy the initial inode image to the object created. Each node has access to the data storage blocks managed by other nodes. Accordingly, the node 104 can access the data for the cloned file that is currently managed by the node 102. This access is further described below in reference to FIG. 2.

Figure 2:
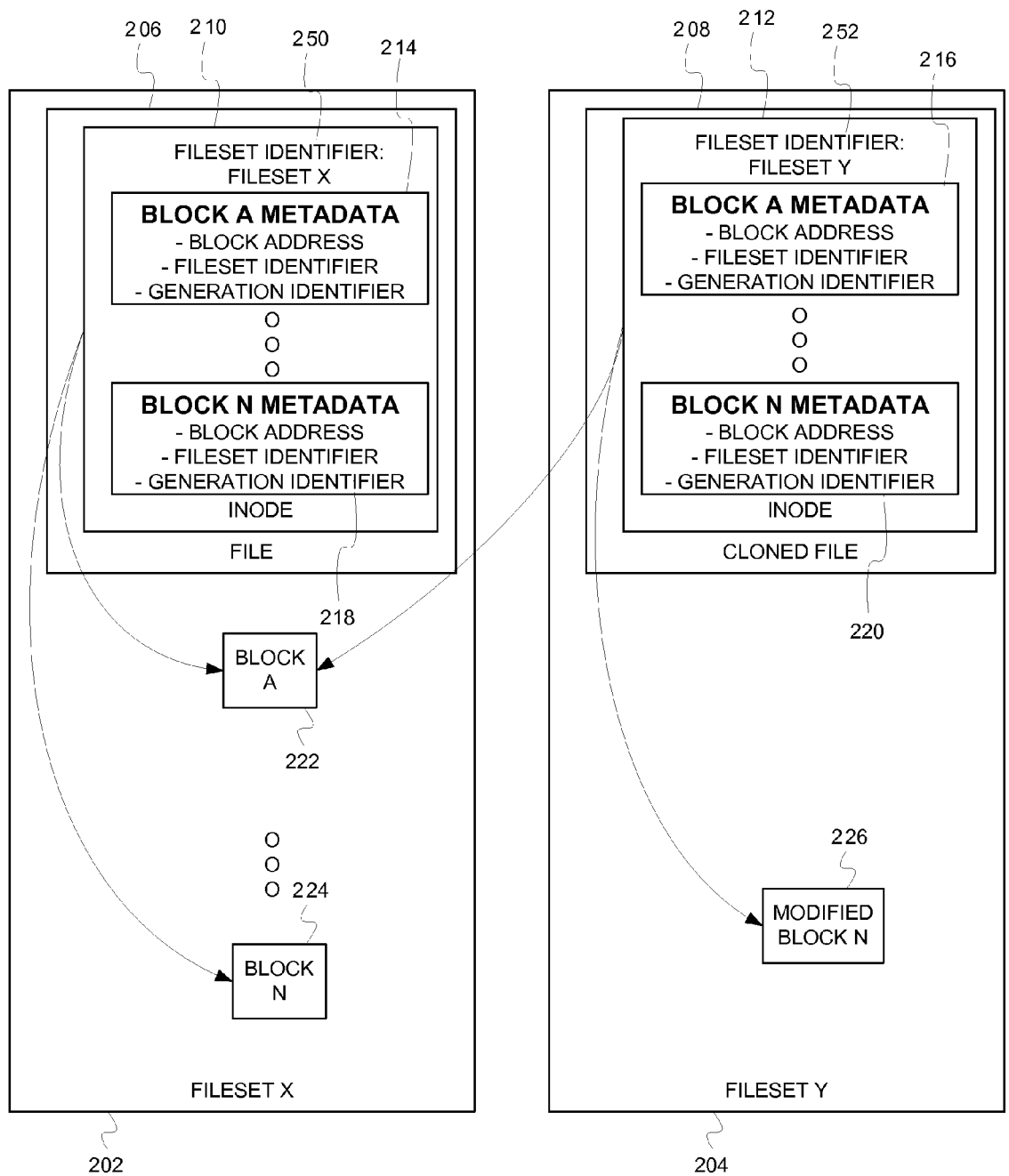
FIG. 2 is a an example conceptual diagram of metadata in inodes of a clone file and a cloned file (or clone source file) grouped into different filesets, according to some example embodiments.

FIG. 2 is a an example conceptual diagram of metadata in inodes of a clone file and a cloned file (or clone source file) grouped into different filesets, according to some example embodiments. FIG. 2 includes two filesets (a fileset X 202 and a fileset Y 204). The fileset X 202 and the fileset Y 204 can be in a same or different server. The fileset X 202 comprises a file 206. The fileset Y 204 comprises a file 208. In this example, the file 206 is the source file ("clone source file") for the clone file 208. The file 206 comprises a data block A 222 and a data block N 224, which store data that is considered to be part of the file 206.

The file 206 comprises an inode 210 that includes metadata for the file 206. The metadata includes a fileset identifier 250 that indicates fileset X. The metadata also includes metadata for the data of the file 206—block A 222 and block N 224. The inode 210 includes metadata 214 for block A 222 and metadata 218 for block N 224. The metadata 214 includes the block address, fileset identifier and generation identifier for the block A 222. The metadata 218 includes the block address, fileset identifier and generation identifier for the block N 224. For this example, the fileset identifier stored in the metadata 214 and the metadata 218 is the identifier for the fileset X. In some embodiments, the block metadata is a hash of the block address, fileset identifier, and generation identifier of the corresponding data block.

The file 208 comprises an inode 212 that includes metadata for the file 208. The metadata includes a fileset identifier 252 (fileset Y). The metadata also includes metadata for the data of the file 208. At this point, block A 222 has not been modified since the clone file 208 was created from the clone source file 206. Thus, the metadata for the file 208 still points to block A 222, indicates the same generation number, and the same fileset identifier (fileset X in this case). When the file 206 is cloned, data of the inode 210 is used to create the inode 212. In this example, the clone file 208 is created in a different fileset than the fileset X, hence the inode 212 is created in a different fileset than fileset X. Initially, the inode 212 maintains most of the same metadata as the inode 210. One example of a difference would be the fileset identifier (i.e., the inode 212 indicates the fileset Y instead of the fileset X). Accordingly, the inode 212 initially references the same data blocks as the inode 210. However, a modification to data of the clone file 208 is implemented with a redirect-on-write, causing an affected data block to be written to a new location. For this example, the modification affects the data of the data block N 224. As a result of the modification, the inode 212 for the clone file 208 references a modified block N 226. The modification was to the clone file 208, so the inode 210 still references the block N 224.

Although the above example figures depict direct block pointers, the example figures should not be used to limit embodiments. Embodiments can maintain one or more levels of indirection between an inode and a data block. For example, the inode 210 can point to indirect block pointers that point to data blocks of the file 206. After cloning the file 206, the inode 212 can reference those same indirect block pointers. Alternatively, embodiments can copy content of the indirect block pointers to new locations for the inode 212. So, the inode would initially (prior to any clone modifications) resolve to the same data blocks as the clone source file, but resolve via different indirect block pointers, which have the same pointers as the indirect block pointers of the clone source file.

Figure 3:
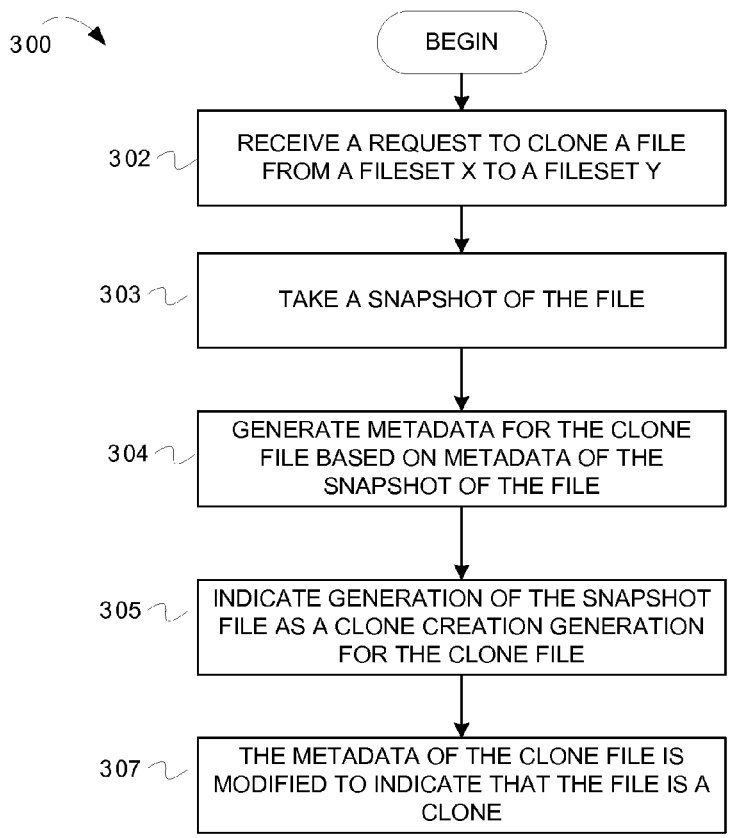
FIG. 3 is a flowchart illustrating operations for file cloning across different filesets.
Figure 4:
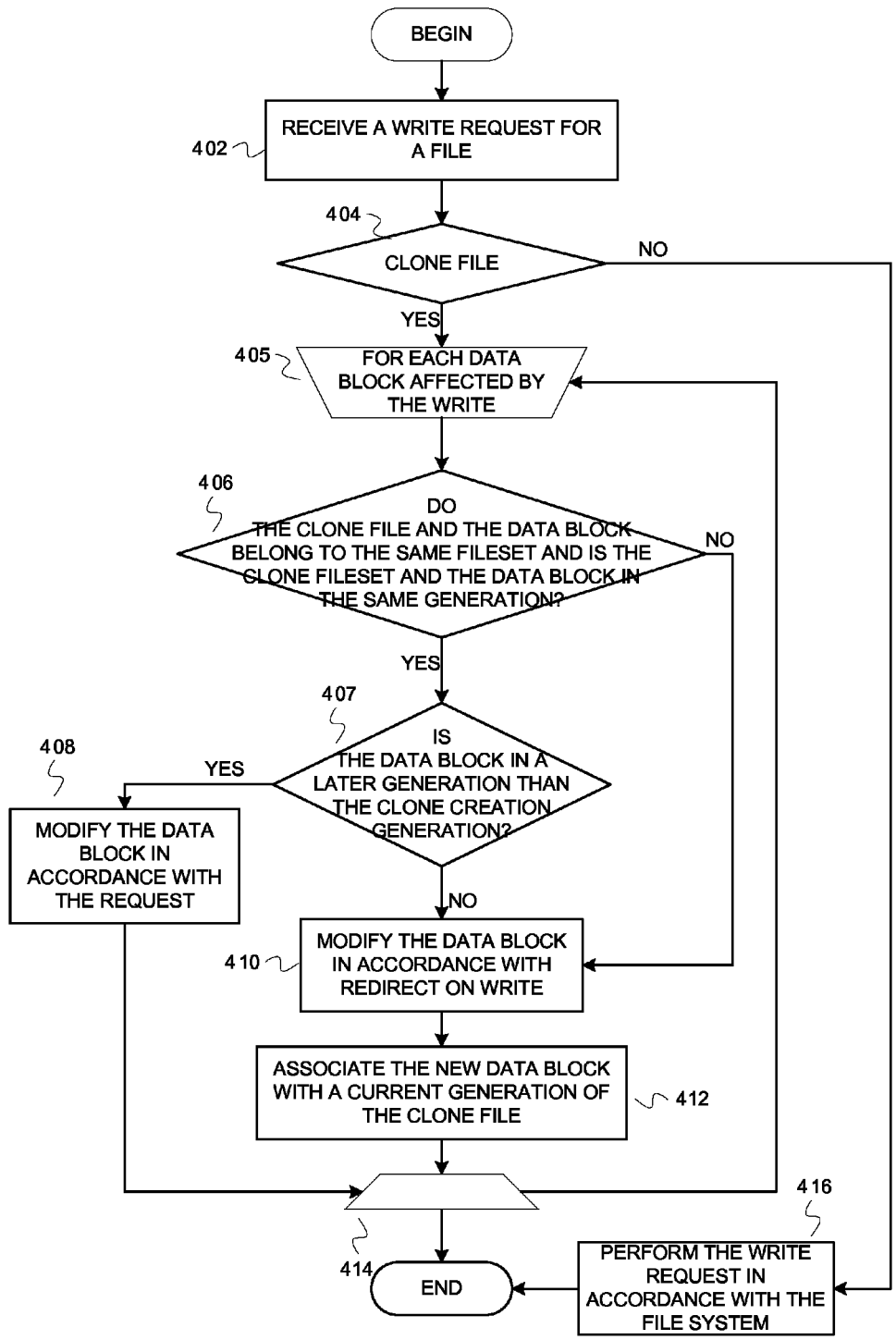
FIG. 4 is a flowchart illustrating example operations for modifying a clone file.

Operations of file cloning are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart. Two flowcharts are now described. FIG. 3 illustrates operations cloning a file between filesets in a different fileset relative to the clone source file. FIG. 4 illustrates operations that are in response to write operation that targets a clone file. The operations of the flowcharts 300-400 can be performed by either of the modification modules 176-174 of FIG. 1. However, embodiments are not so limited. Such operations can be performed by different modules that can be on a same or different device. For example, some or all of the operations can be performed by a module or modules that are resident in the meta-fileset node 105. FIG. 3 is first described.

FIG. 3 is a flowchart illustrating operations for file cloning across different filesets. A flowchart 300 depicts example operations for cloning a file across filesets with a snapshot mechanism. A request to clone a file from a fileset X to a fileset Y is received (302). An explicit command can be entered to clone the file. In addition, an application or an operating system process can request creation of a clone across filesets.

In response to the cloning request, a snapshot of the file is taken (303). As a result of the snapshot, metadata is updated to preserve the data blocks in persistent memory (e.g., storage). For instance, generation numbers are utilized to distinguish between a current generation of data and an earlier generation (i.e., a snapshot). With the generation numbers, a file system can direct modifications to new locations while preserving the persistent snapshot data. In the cloning context, the generation number prevents a modification to the clone source file from affecting the clone file. If a modification is made to the clone source file, the generation number of a corresponding data block will cause the modification to be made at a new location (i.e., a new data block will be allocated). Thus, the clone file and the clone source file can initially reference the same data blocks, and a subsequent modification to the clone source file will not affect the clone file. Furthermore, indications are recorded to prevent snapshot data blocks that back a clone file from being removed (e.g., the snapshot data blocks are marked or tracked). If a data block belongs to an older snapshot that is to be removed and backs a clone file, the recorded indication will prevent the data block from being removed, thus preventing the clone file from being corrupted. Embodiments can mark individual data blocks to indicate that the data block backs a clone file or mark individual data blocks to indicate the clone file that is backed. Embodiments can also keep count of clone files connected to a snapshot. For instance, a snapshot can encompass multiple filesets that include files connected to several clone files in different filesets. As the clone files are modified and the connections severed, the count can be decremented. When the clone connection count reaches zero, then the snapshot can be removed.

Metadata is generated for the clone file based on the metadata of the snapshot file (304). For instance, an inode is created in the fileset Y with the metadata of the snapshot file in fileset X. The metadata for the clone indicates a same file size, attributes, pointers, etc.

The generation of the snapshot file is indicated as the creation generation for the clone file (305). For instance, a generation number associated with the data blocks of the snapshot file are recorded in the inode of the clone file.

The metadata of the clone file is updated to indicate that the file is a clone (307). For example, a flag is set to indicate the file is a clone file. The indication of a file can be explicit or implicit. For instance, an inode can comprise a field for a file generation number and a clone creation generation number. A non-zero value for the clone creation generation number can implicitly indicate that the file is a clone file.

FIG. 4 is a flowchart illustrating example operations for modifying a clone file.

A write request for a file is received (402). The request may originate from a client or a server of the file system. In some example embodiments, a node that manages a file hierarchy of the file system determines location(s) of a set of one or more data blocks and communicates the location to the requestor. In some embodiments, the node handles the write request. In some embodiments, the node ("global node") determines which of other nodes in a cluster manages a fileset associated with the file. The global node can forward the write request to the node that manages the fileset or communicate an identity of the managing node (e.g., network address) to the requestor.

It is determined whether the file indicated by the write request is a clone file (404). For example, the file system reads an inode of the clone file to determine whether a clone flag/bit is set and/or whether the inode of the clone file indicates a non-zero clone creation generation. Embodiments may utilize a zero value as a generation. In that case, a special value or null value can be set for the clone creation generation to indicate that the file is not a clone. If the file is a clone file, then operations flow to 406. Otherwise, operations flow to 416.

If the file is a clone file, then a loop of operations begins for each data block affected by the write (405). For example, the write request can indicate a plurality of data blocks and write operations to be performed for each of the data blocks. Embodiments can also indicate a single data block per write request. For each data block, the operations represented by blocks 407, 408, 410, and 412 are relevant.

It is determined if the data block and the clone file are indicated as being within a same fileset and if the data block and the fileset of the clone belong to a same generation (406). For example, a fileset identifier in metadata for the data block is compared against a fileset identifier indicated in metadata for the clone file. Metadata of the fileset associated with the clone file can be read to determine clone fileset generation, and compared against generation read from metadata of the data block. The fileset identifiers can match either because the clone was not created in a different fileset than the clone source, or the data block has already been modified for the clone file (i.e., the data block is not shared with another file).

If the data block and the clone file are within the same fileset, and the data block and the clone fileset are within the same generation, then it is determined if the data block is in a later generation than the clone creation generation (407). For example, an inode of the clone file is read to determine a clone creation generation, and a generation of the data block is read from metadata of the data block. The generations are compared to determine if the data block generation is greater than the clone creation generation. If the data block generation is greater than the clone creation generation, then the clone file can modify the data block at the location. The data block is no longer shared with the clone source, and/or the data block is not part of a snapshot made at creation of the clone. If the data block generation is less than or equal to the clone creation generation, then the data block generation is still shared with the clone source, part of the initial snapshot incident with creation of the clone, and/or part of a snapshot for the clone file or the fileset of the clone file.

If the data block generation is greater than the clone creation generation, then the data block is modified in accordance with the request (408). For instance, a client can modify the data block in accordance with an update-in-place paradigm. In some embodiments, a server or node performs the modification for the client. After the modification, processing continues to the next affected data block or ends (414).

If the data block generation is less than or equal to the clone creation generation (407), then the data block is modified in accordance with redirect-on-write (410). The data block is also modified in accordance with redirect-on-write (410) if the data block was determined to be in a different fileset than the clone file or the data block generation was determined to be different than the fileset generation of the clone file (406). For instance, a new block in memory is allocated (if not pre-allocated), and the data of the data block along with the modification are written to the new block. Thus, the modification to the clone file does not affect an underlying data block shared with a clone source and/or preserved as a snapshot. In some embodiments, a node, which communicates metadata of the clone file to a requestor of the write request, indicates to the requestor that the write request is to be done as a redirect-on-write. For instance, a client may typically modify a file in accordance with an update-in-place paradigm. But the node managing the fileset of a clone file can set a flag of transmit a command to force the client to perform or cause to be performed redirect-on-write to implement the write request on a data block that is not owned by the clone file.

The new data block is then associated with a current generation of the clone file (412). For example, the current generation of the clone file indicated in the clone file inode is written to the data block and/or written to metadata associated with the data block. This recording of the current generation identifies the data block as being "owned" by the clone file, thus allowing subsequent modifications to be performed without concern of corrupting a data block of another file or snapshot. Although this example is described with reference to generation numbers, embodiments are not limited to that terminology or techniques. Embodiments can utilized other techniques to indicate that an underlying or backing data block for a clone file can be modified without concern of corrupting another file that shares the data block or corrupting a snapshot. Processing continues to the next affected data block or ends (414).

If the file indicated by the write request was determined not to be a clone (404), then the write request is handled in accordance with the file system (416). For example, if the file system enforces a redirect-on-write paradigm, then the write is performed accordingly. If the file system allows for the write to be handled as an update-in-place, then the write is done according to an update-in-place paradigm.

The operations of the above flowchart are intended to be examples that aid in understanding the inventive subject matter, and should not be used to limit embodiments. For instance, additional operations can be performed in FIG. 4 to determine whether a snapshot exists for a clone file or data block to be modified.

Figure 5:
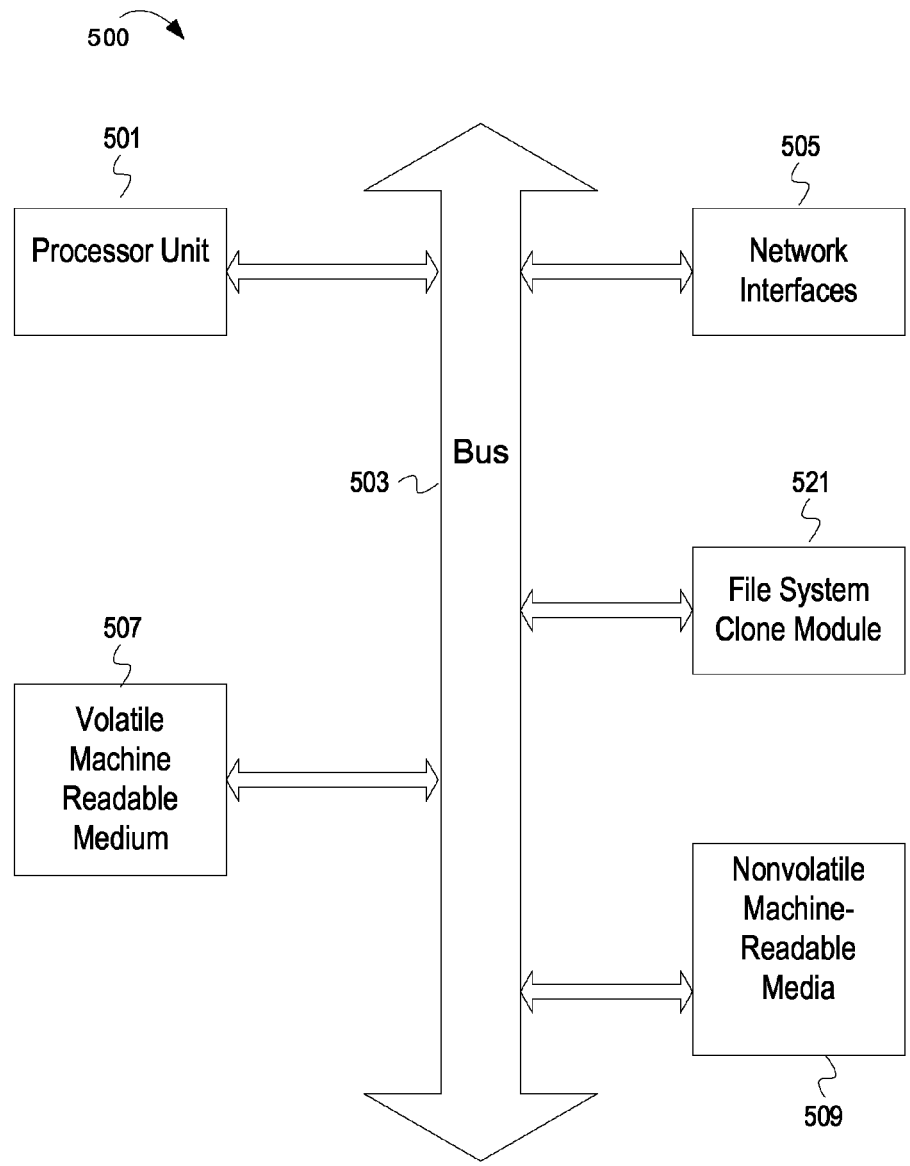
FIG. 5 is a block diagram illustrating a computer system, according to some example embodiments.

FIG. 5 is a block diagram illustrating a computer system, according to some example embodiments. FIG. 5 can be representative of any of the components shown in FIG. 1. For example, FIG. 5 can be representative of any of the node A 102, the node N 104, the meta-fileset node 105 and the client 108. A computer system 500 includes a processor unit 501 (possibly including multiple processors, multiple cores, multiple nodes, and/or implementing multi-threading, etc.). The computer system 500 includes a volatile machine-readable medium 507. The volatile machine-readable medium 507 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a nonvolatile machine-readable media 509 (e.g., optical storage, magnetic storage, etc.). The computer system 500 also comprises a file system clone module 521 coupled with the bus 503. The file system clone module implements functionality described above for cloning a file across different filesets. The file system clone module 521 can be at least partially implemented on the processor unit 501, an application specific integrated circuit, a co-processor, etc. At least some of the functionality of the file system clone module can also be embodied as computer readable program code embodied in at least one of the volatile machine-readable medium 507 and the non-volatile machine readable media 509.

Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the volatile machine-readable medium 507 may be coupled to the processor unit 501.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, by a processor, that a write request indicates a clone file that was cloned from a file in a first fileset, wherein the clone file is of a second fileset and a clustered file system comprises the first fileset and the second fileset;
    determining a data block of the clone file affected by the write request;
    determining that the data block at a current location cannot be modified;
    in response to a determination that the data block at the current location cannot be modified,
        implementing the write request with respect to the data block at a different location; and
        indicating that the data block at the different location can be modified for subsequent write requests that indicate the clone file;
    wherein the clone indications comprises at least one of a clone flag and a clone creation generation;
    causing a snapshot of at least the file in the first fileset to be created in response to a request to clone the file from the first fileset into the second fileset; and
    associating the snapshot with the clone file; and
        preventing removal or deletion of the snapshot while the clone file is associated with the snapshot.

2. The method of claim 1 further comprising generating metadata for the clone file based, at least in part, on metadata of the file in the first fileset in response to a request to clone the file from the first fileset into the second fileset.

3. The method of claim 2, wherein the metadata for the clone file indicates the second fileset and initial metadata of the data block indicates the first fileset.

4. The method of claim 1 further comprising indicating in metadata of the clone file that the clone file is a clone.

5. The method of claim 1, wherein said determining that the clone file was cloned from a file in a first fileset comprises reading a clone indication in metadata of the clone file, wherein the clone indications comprises at least one of a clone flag and a clone creation generation.

6. The method of claim 1, wherein said determining that the data block at the current location cannot be modified comprises at least one of:
    determining that the data block belongs to a generation different than a generation of the second fileset; and
    determining that the data block does not belong to a generation later than a generation of creation of the clone file.

7. The method of claim 1, wherein said implementing the write request with respect to the data block at the different location comprises implementing the write request in accordance with redirect-on-write.

8. The method of claim 7, wherein said implementing the write request in accordance with redirect-on-write comprises indicating to a requestor of the write request that modification of the data block will be done in accordance with redirect-on-write.

9. The method of claim 1, wherein said indicating that the data block at the different location can be modified for subsequent write requests that indicate the clone file comprises updating metadata of the data block to indicate the second fileset.

10. The method of claim 9, wherein said indicating that the data block at the different location can be modified for subsequent write requests that indicate the clone file also comprises updating the metadata of the data block to indicate a current generation of the clone file.

* * * * *